United States Patent Office 2,942,188
Patented June 21, 1960

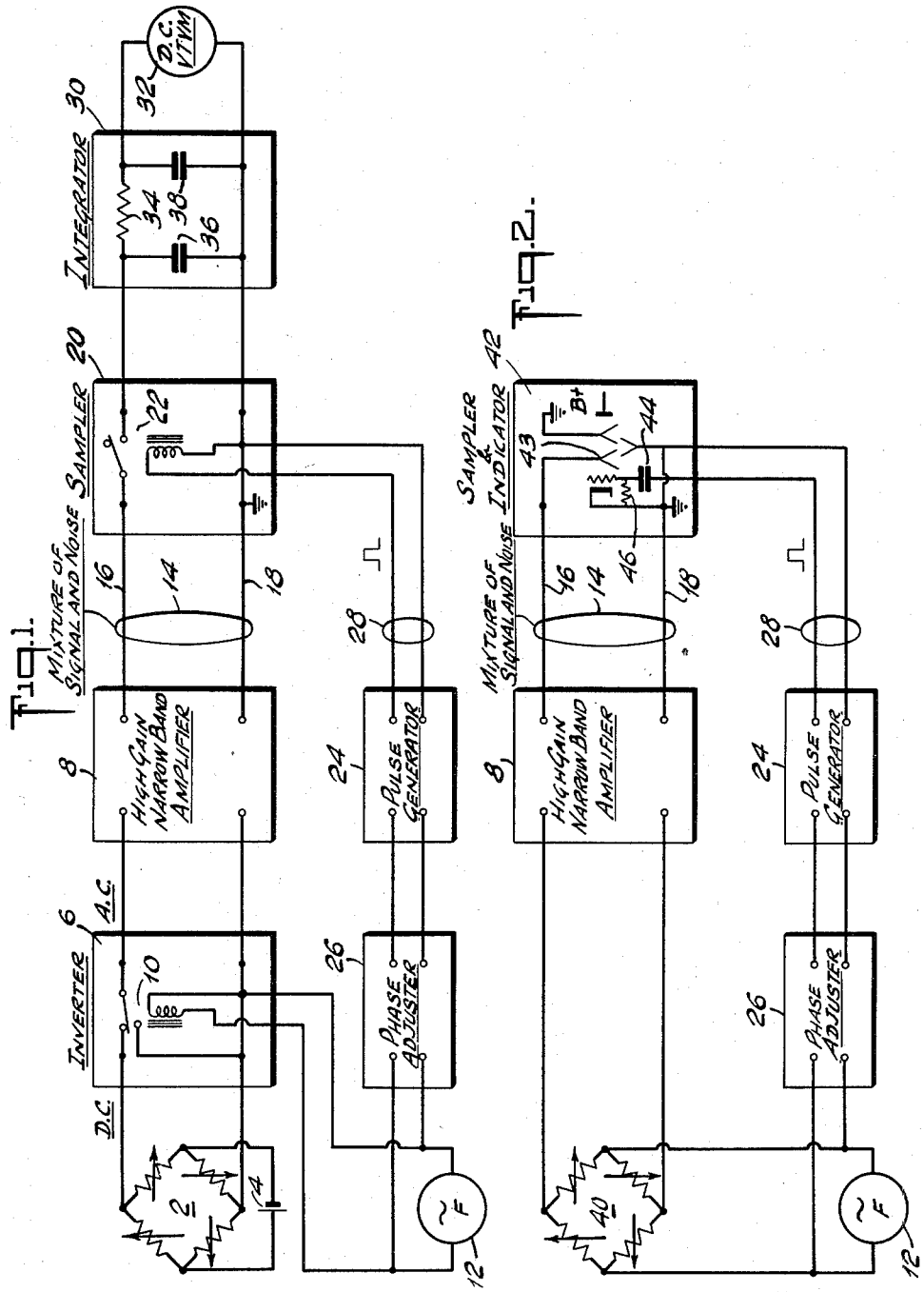

2,942,188

DISCRIMINATOR CIRCUIT

Alex V. Mitchell, Bloomfield, N.J., assignor to Tung-Sol Electric Inc., a corporation of Delaware Filed Apr. 30, 1954, Ser. No. 426,810

6 Claims. (Cl. 324—118)

The present invention comprises an improved method and means for discriminating between a desired sine wave signal of known phase and frequency and a band width of undesired sine wave signals of random phase and frequency. The invention is particularly adapted for use in increasing the apparent signal-to-noise ratio of maximum gain null detectors and will therefore be described with reference to such application.

The invention is predicated upon the fact that if a mixture of sine wave signals of random phase and frequency is sampled at regular intervals the statistical average of such samplings will be zero, that is, over a period of time, and at definite intervals, there will be as many measurements of one sign as there are of opposite sign and the sum of the magnitudes of such measurements will be substantially equal. Thus, if there is combined with such mixture of sine wave signals of random phase and frequency a desired sine wave signal of known phase and frequency, sampling of such combined signals at intervals corresponding to the peak of the desired sine wave signal will yield an output which when integrated is a measure solely of the peak value of the desired signal. In maximum gain null detectors the desired signal is the unbalance signal of a bridge network or other measuring circuit. In order to detect when such signal approaches zero a high gain narrow band amplifier is ordinarily provided. However, the addition of such amplifier and its input circuit introduces noise into the amplified output signal with the result that the desired signal is no longer pure but is combined with a mixture of signals corresponding to the noise.

In accordance with the present invention the output from the amplifier of a null high gain detector can be analyzed to detect and measure such part thereof as corresponds to the desired signal output from the bridge or other measuring circuit. The desired measurement is obtained by intermittently delivering the amplifier output to an integrating circuit or similar means associated with an indicating or display device. Pulses phased to coincide with the peaks of the desired signal wave are generated and used to control the delivery of the output from the amplifier to the indicator or display means. The invention is applicable both to direct current null detectors and to alternating current null detectors and various instrumentalities may be employed for integration and display of the output signal.

For a better understanding of the invention and of specific embodiments thereof reference may be had to the accompanying drawing of which:

Fig. 1 is a circuit diagram embodying the invention as applied to a direct current null detector and employing an integrating circuit and a direct current vacuum tube voltmeter as the display means; and Fig. 2 is a diagram of a circuit embodying the invention as applied to an alternating current null detector and employing display means in which integration is performed by the eye.

In Fig. 1 a measuring circuit, the output of which yields the signal to be detected, is indicated symbolically as a direct current bridge network 2 energized by a battery 4. An inverter 6 which is connected across the output terminals of the bridge, converts the output signal therefrom to a square wave signal suitable for amplification by a high gain amplifier 8. The inverter 6 may be of any desired construction but is shown diagrammatically as comprising a chopper 10 the winding of which is energized from a source 12 of constant frequency and the armature of which, under control of the winding, intermittently opens the output circuit of the bridge. The inverter 6 could and ordinarily would, include known means for smoothing the output wave in order that the input to the amplifier 8 would be a sine wave rather than a square wave or alternatively, the amplifier 8 could include such smoothing means in its circuit.

The output from the amplifier 8 includes the amplified signal from the bridge 2 and also signals of random phase and frequency corresponding to the noise introduced by the amplifier. Such mixture of desired signal and noise is indicated by the legend on Fig. 1 and by loop 14 encompassing the output leads 16 and 18 from the amplifier 8. This mixture of signals from the amplifier is impressed on a sampler 20 which, as diagrammatically illustrated in Fig. 1, may comprise a second chopper 22 having a winding energized by pulses delivered by a pulse generator 24 energized from source 12, a phase adjustor 26 being inserted between the source 12 and pulse generator to time the occurrence of the pulses with the peaks of the desired sine wave signal. The pulses delivered to the winding of the chopper 22 are shown symbolically in Fig. 1 adjacent the loop 28 encompassing the output leads of the pulse generator. The winding of chopper 22 when energized by a pulse closes a switch in line 16 between the amplifier 8 and an integrator 30. The output of the integrator 30 is delivered to a direct current vacuum tube voltmeter 32. The circuit of the integrator is indicated symbolically as comprising a series resistor 34 and shunt capacitors 36 and 38.

With the above described circuit and with suitable adjustment of the phase of the input energy delivered to the pulse generator 24, the output of the amplifier 8 comprising the amplified desired signal from the bridge 2 and the mixture of signals corresponding to the generated noise, is delivered to the integrator 30 at intervals corresponding to the peak of the desired signal. The voltage impressed upon the vacuum tube voltmeter 32 is a steady voltage corresponding to the integration of the output of the sampler and will, as heretofere described, be an accurate measure of the peak of the desired signal. Thus, the circuit has a high signal-to-noise ratio and measurements of the small signal output of the bridge as the bridge approaches balance can be made with great accuracy.

The integrator 30 and direct current voltmeter 32 are but an example of display means which may be employed for yielding the desired indication. For example, an indicator tube such as a 6AL7GT in which integration is performed by the eye could be employed in place of the integrating circuit 30 and voltmeter 32 and such an indicating tube when suitably pulsed could serve also the purpose of the sampler 20. Such an arrangement is shown diagrammatically in the circuit of Fig. 2 to which reference may now be had.

In the specific circuit of Fig. 2, an alternating current bridge network 40 is diagrammatically indicated as the source of the signal to be measured and therefore no inverter to convert to alternating current is required. The output signal from the bridge 40 is delivered directly to the high gain narrow band amplifier 8 and the output thereof comprising the desired amplified signal mixed with noise as indicated by the loop 14, is delivered across the cathode and one deflecting electrode 43 of a 6AL7GT, schematically illustrated in the rectangle 42.

The other two deflecting electrodes of the tube are grounded as is the cathode of the tube and the output lead 18 from amplifier 8. The fluorescent target of the tube is connected to a source of positive potential, indicated as B+ and the control grid of the tube is connected through a capacitor 44 to the ungrounded output lead of the pulse generator 24. A suitable grid bias resistor 46 is connected between the cathode and grid of the tube. As in the circuit of Fig. 1 the pulse generator is supplied with energy from the constant frequency source 12 through the phase adjustor 26.

With the above described circuit the target area responsive to the potential of deflecting grid 43 will receive electrons from the cathode during each positive pulse applied to the control grid, that is, at intervals corresponding to the peaks of the desired signal. The fluorescent pattern appearing on the target will thus correspond to the average potential of the deflecting grid 43 when the desired signal is a maximum. Thus the tube performs the combined operations of sampling, integrating and indicating.

The invention has now been described with reference to two embodiments thereof. Although the specific display means of Fig. 1 which comprises a separate integrator and voltmeter, has been shown in connection with a direct current null indicator, obviously such display together with the sampler could be used in the circuit of Fig. 2 in place of the indicator tube shown therein, and conversely, the combined sampler and indicator tube of Fig. 2 could be employed in a direct current null indicator in place of the sampler, integrator and voltmeter of Fig. 1.

For maximum signal-to-noise ratio the sampling pulse should be relatively narrow and should occur at peaks of the signal wave, that is at 90° or 270° angles, once each cycle. So far as the principle of this invention is concerned, some improvement in signal-to-noise ratio will result so long as the pulses do not occur at 0° or 180° angles of the signal wave and measurements could be made when frequency is an integral multiple of the number of pulses per second, that is when pulses occur once in two or more wavelengths.

As heretofore indicated, the bridge networks of Figs. 2 and 4 of the drawing are symbolic of any measuring circuit with which the invention is adapted for use. No attempt has been made to illustrate specific elements of the amplifier, inverter, phase adjustor and pulse generator circuits as each of these instrumentalities are well known in the art and per se, form no part of the present invention.

The following is claimed:

1. In an indicating circuit for detecting an alternating current signal of known phase and frequency, the combination comprising a source of alternating voltage of the frequency of the signal to be detected, a high gain narrow band amplifier for amplifying the signal, a pulse generator energized from said source for creating a series of pulses of the frequency of the source and of short duration compared to the signal wave, phase adjusting means interposed between said source and said pulse generator for causing coincidence of the created pulses with the peaks of the amplified signal, means controlled by the created pulses for sampling the output of said amplifier and display means controlled by said sampling means for signifying the average of the samplings of the amplifier output to thereby discriminate between the desired signal and signals of random phase and frequency in the amplifier output due to amplifier noise, said display means comprising an integrating circuit and a voltmeter, said integrating circuit interconnecting said pulse controlled means with said voltmeter.

2. In an indicating circuit for detecting an alternating current signal of known phase and frequency, the combination comprising a source of alternating voltage of the frequency of the signal to be detected, a high gain narrow band amplifier for amplifying the signal, a pulse generator energized from said source for creating a series of pulses of the frequency of the source and of short duration compared to the signal wave, phase adjusting means interposed between said source and said pulse generator for causing coincidence of the created pulses with the peaks of the amplified signal, means controlled by the created pulses for sampling the output of said amplifier and display means controlled by said sampling means for signifying the average of the samplings of the amplifier output to thereby discriminate between the desired signal and signals of random phase and frequency in the amplifier output due to amplifier noise, said display means comprising a fluorescent target of an indicating tube of the type including a cathode, control grid and deflecting electrodes and said pulse controlled means comprising one of the deflecting electrodes across which and said cathode the amplifier output is impressed and the control grid across which and said cathode the created pulses are impressed.

3. Means for increasing apparent signal-to-noise ratio of a null detector circuit of the type including a high gain narrow band amplifier for a desired signal of known phase and frequency which comprises a source of alternating voltage of the frequency of the signal, a pulse generator energized from said source for creating a series of pulses of the frequency of the signal and of short duration compared to the signal wave, phase adjusting means interposed between said source and said generator for causing coincidence of the created pulses with the peaks of the amplified signal, a display device including integrating and indicating means, and means controlled by the created pulses of intermittently impressing the amplifier output on said display device to yield an indication of the integrated input to the display means.

4. A null detector circuit of high signal-to-noise ratio comprising in combination a source of alternating voltage, inverting means energized from said source for converting a direct current signal into an alternating current signal of the frequency of the source, a high gain narrow band amplifier for the converted signal, a pulse generator energized from said source for generating a series of pulses of the frequency of the source and of short duration compared to the signal wave, phase adjusting means interposed between said source and said pulse generator for causing coincidence of the generated pulses with the peaks of the amplified converted signal, an integrating circuit, an electromagnetic chopper energized by the generated pulses and adapted when energized to impress the output of the amplifier upon said integrating circuit and a direct current voltmeter for indicating the integrated output of said integrating circuit.

5. The combination according to claim 3 wherein said display means comprises an integrating circuit and a vacuum tube voltmeter and said pulse controlled means comprises an electromagnetic chopper for intermittently connecting said amplifier to said integrating circuit.

6. The combination according to claim 3 wherein said display means and said pulse controlled means together comprise an indicating tube having a target adapted to fluoresce when bombarded by electrons, a cathode for emission of electrons, a control grid for controlling the magnitude of the electron beam and deflecting electrodes for deflecting the electron beam to certain areas of the target, the output of the amplifier being connected across one deflecting electrode and the cathode of said tube and the created pulses being impressed across the control grid and cathode of said tube.

(References on following page)

References Cited in the file of this patent

UNITED STATES PATENTS

| | | |
|---|---|---|
| 2,133,670 | Schuchmann | Oct. 18, 1938 |
| 2,442,298 | Liston | May 25, 1948 |
| 2,459,730 | Williams | Jan. 18, 1949 |
| 2,489,297 | Labin et al. | Nov. 29, 1949 |
| 2,624,770 | Yetter | Jan. 6, 1953 |
| 2,679,028 | Otis et al. | May 18, 1954 |

FOREIGN PATENTS

| | | |
|---|---|---|
| 565,461 | Great Britain | Nov. 10, 1944 |